United States Patent [19]

Pradon

[11] 4,033,449
[45] July 5, 1977

[54] APPARATUS FOR HANDLING BULK MATERIALS

[76] Inventor: Jacques Pradon, 19 Avenue de la Tourelle, Saint-Maur-des-Fosses, France

[22] Filed: Jan. 24, 1975

[21] Appl. No.: 543,979

Related U.S. Application Data

[63] Continuation of Ser. No. 242,378, April 10, 1972.

[30] Foreign Application Priority Data

Apr. 15, 1971 France .............................. 71.13234
Mar. 24, 1972 France .............................. 72.10357

[52] U.S. Cl. ................................ 198/520; 37/80 R; 214/15 E
[51] Int. Cl.² ........................................ B63B 27/00
[58] Field of Search ............ 198/7, 12, 36, 71, 520; 56/328 R; 37/8, 28, 101, 80 R, 80 A, 85, 94, 192 R; 214/15 E, 10; 172/182, 193

[56] References Cited

UNITED STATES PATENTS

| 755,681 | 3/1904 | Long .................................... 198/71 |
| 2,579,153 | 12/1951 | Meissner ......................... 214/10 X |
| 2,867,046 | 1/1959 | Baer ..................................... 37/85 |

Primary Examiner—Evon C. Blunk
Assistant Examiner—Douglas D. Watts
Attorney, Agent, or Firm—Cameron, Kerkam, Sutton, Stowell & Stowell

[57] ABSTRACT

Bulk handling apparatus which includes an elevator carried by a vertical support arm movable about its axis and horizontally, the arm itself mounted on a lifting mechanism, a discharge device for elevated material, and a guide device on the arm on the same side as the rising run of the elevator which device during horizontal travel of the arm will preset material to be elevated to the elevator.

4 Claims, 9 Drawing Figures

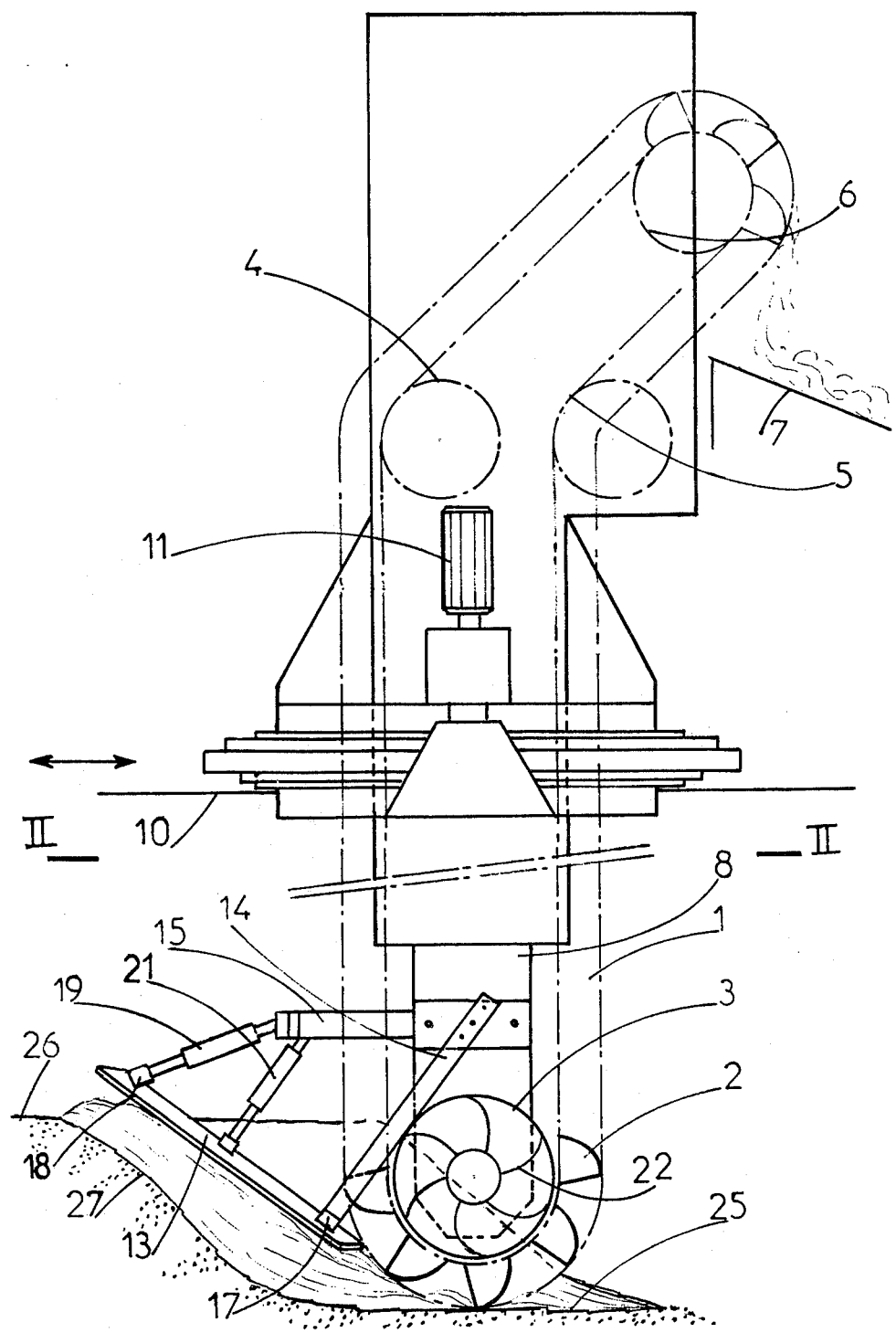
FIG:1

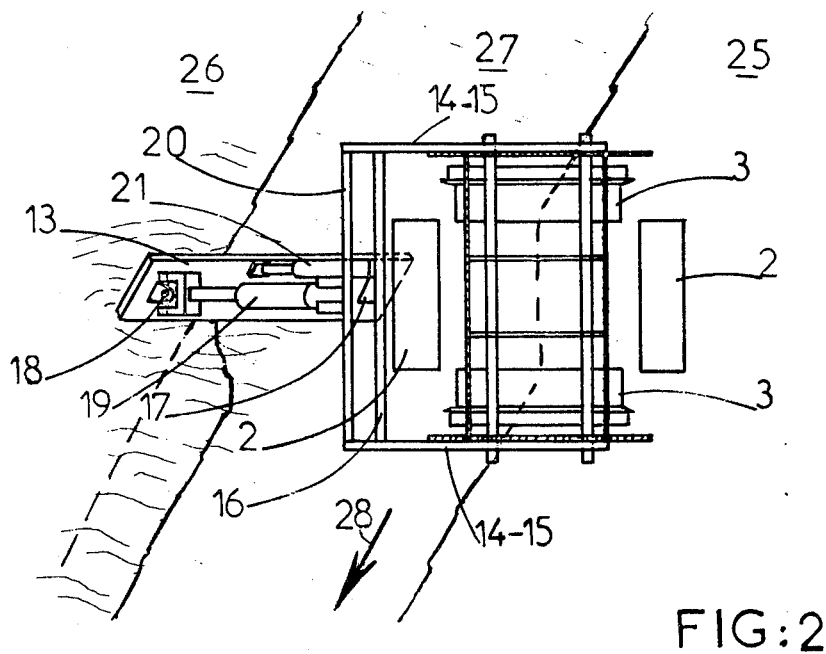
FIG:2
FIG:3
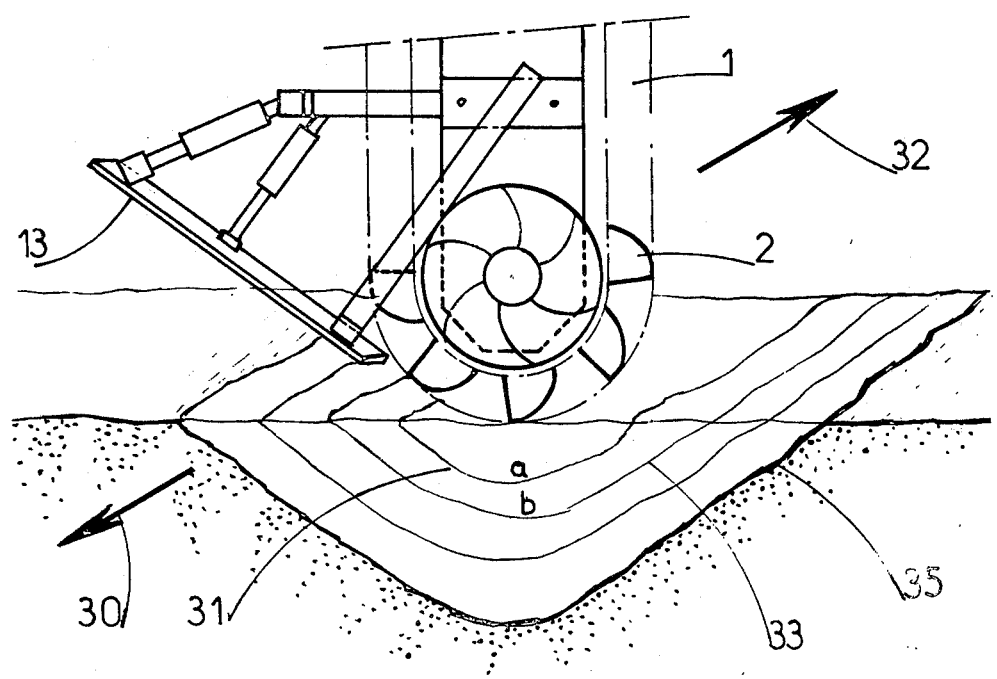

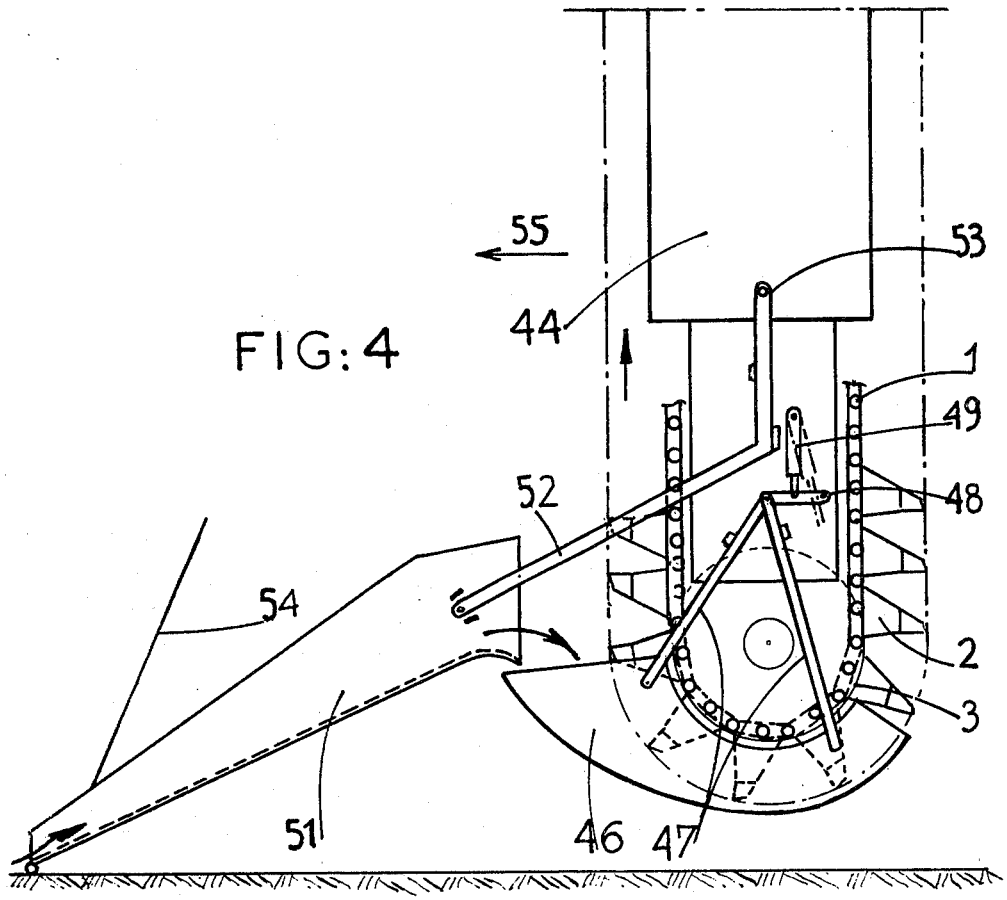
FIG:4
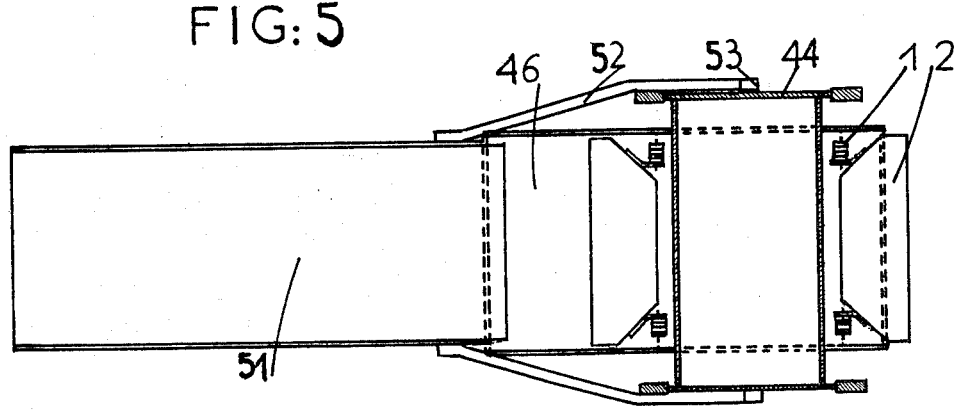
FIG:5

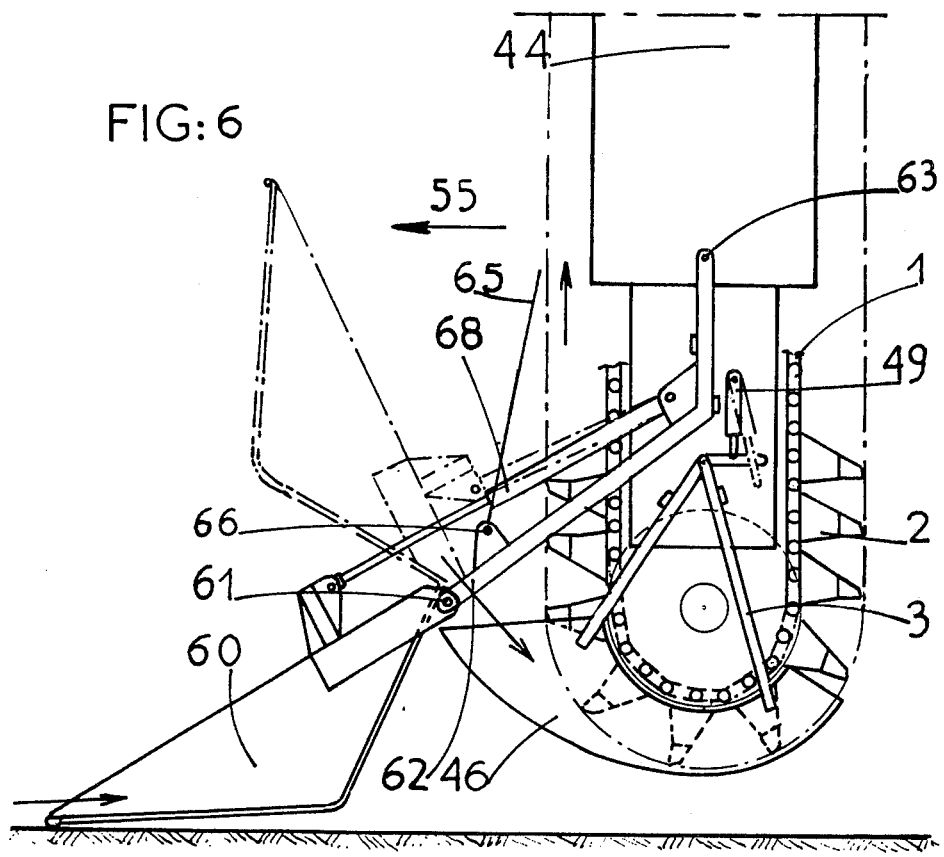
FIG: 6
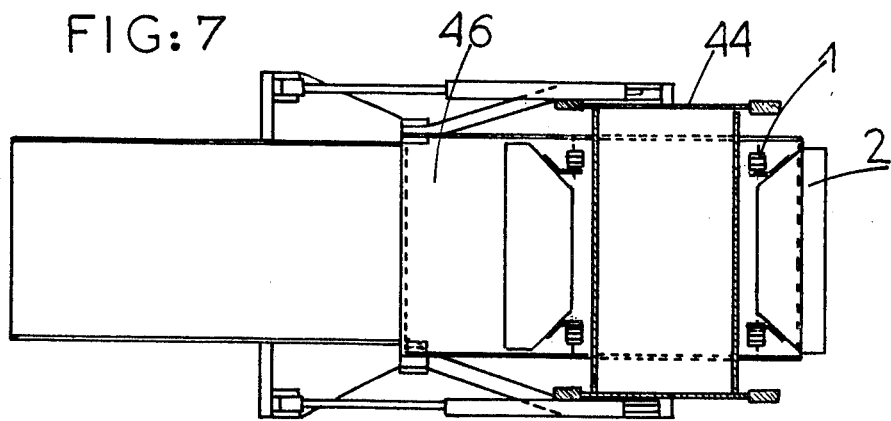
FIG: 7

APPARATUS FOR HANDLING BULK MATERIALS

This is a Continuation, of application Ser. No. 242,378 filed Apr. 10, 1972.

This invention is for improvements in or relating to a bulk handling apparatus of use e.g. for collecting stored powdery or granular material and supplying it to a conveyor or loading hopper. The improvements are also of use for helping to collect the remaining layer of stored material, for instance, for cleaning the bottom of a ship's hold.

All the known bucket or grab elevator facilities have the disadvantage of being difficult to operate at full capacity because of the difficulty of completely filling the buckets or grabs, for each element of the elevator can deal only with materials disposed on its path, and so fresh material must immediately be supplied to the furrow left as the "wake" of a bucket so that the next bucket can be filled. This disadvantage can be offset to some extent if the elevator moves horizontally into the heap as it operates; unfortunately, high speeds of horizontal movement then become necessary, and if the material being handled is fairly dense the elevator buckets are called on to act as excavating tools, with the result that the bucket chain motor may be overloaded.

According to some other suggestions a feed of material to the bottom of the elevator is provided by a device having a rotating member resembling a plough share, such member moving towards the center — i.e. towards the buckets — material heaped in a circle of wider diameter. A facility of this kind is disclosed more particularly by the Applicant's U.S. Pat. No. 3,616,890 of Nov. 2, 1971. A disadvantage of this system is its relative complexity or the need to have means for driving the rotating system at the elevator base or the need for the elevator to rotate permanently around itself to drive the collecting facility permanently mounted at the bottom. Nor do any of these devices provide a completely satisfactory solution of the problem of picking up the last layer of products remaining e.g. at the bottom of a ship's hold after virtually all the products have been removed. Collecting the last layer is always a lengthy and costly operation since the means usually used are other then mechanical.

This invention obviates these disadvantages by means of a facility such that, as the elevator moves horizontally into the heap, the buckets are kept continuously supplied by a continuous "landslide" of material towards the base of the elevator. The facility according to the invention also enables the final layer to be collected very satisfactorily. The invention is of use in a bulk handling apparatus comprising an elevator borne by a substantially vertical moving arm in turn borne by a lifting mechanism comprising means for removing the substances at the elevator exit, the moving arm being orientable around its vertical axis and adapted for horizontal movement. According to the invention, the arm bears an element which is adapted to guide the substances towards the elevator and which is disposed on the same side as the rising run of the elevator and which is independent thereof and which makes use of the horizontal movement of the moving arm to move the substances towards the elevator.

According to a feature of the invention for use in thick-layer operation, the guiding element comprises at least one slat or strip or the like articulated around an axis disposed substantially in the average operating plane of the elevator and inclined to the vertical axis of the arm.

According to another feature, of use for final-layer operation, the guiding element comprises: a first funnel-like constriction extending around the bottom part of the elevator; and a second constriction having its front end disposed at a level slightly below the bottom part of the elevator and its rear end disposed slightly above the orifice of the first funnel constriction.

According to another feature of the invention, also of use for final-layer operation, the guiding element comprises: a first funnel-like constriction extending around the bottom part of the elevator; and a shovel borne at the end of an arm by way of a pivot disposed slightly above the orifice of the funnel-like constriction, the shovel being adapted to take up a collecting position in which its bottom is substantially horizontal, and a discharge position in which its bottom is tilted towards the funnel-like constriction.

The invention will now be described in greater detail with reference to exemplary embodiments shown in the accompanying drawings wherein:

FIG. 1 is a view in elevation of a collecting or pick-up facility using a bucket elevator comprising a guiding element, for thick-layer working;

FIG. 2 is a section on the line II—II of FIG. 1;

FIG. 3 shows the initial phases of the apparatus penetrating into the heap of material;

FIGS. 4 and 5 are views, in elevation and in plan respectively, of the elevator and of its collecting facility and show in simplified form an embodiment using an inclined surface for collecting the final layer;

FIGS. 6 and 7 are views, in elevation and plan respectively, of another embodiment using a collecting shovel, and FIGS. 8 and 9 are views, in elevation and plan respectively, of an embodiment using tilted or inclined collecting slats or strips or the like.

Figure 8:
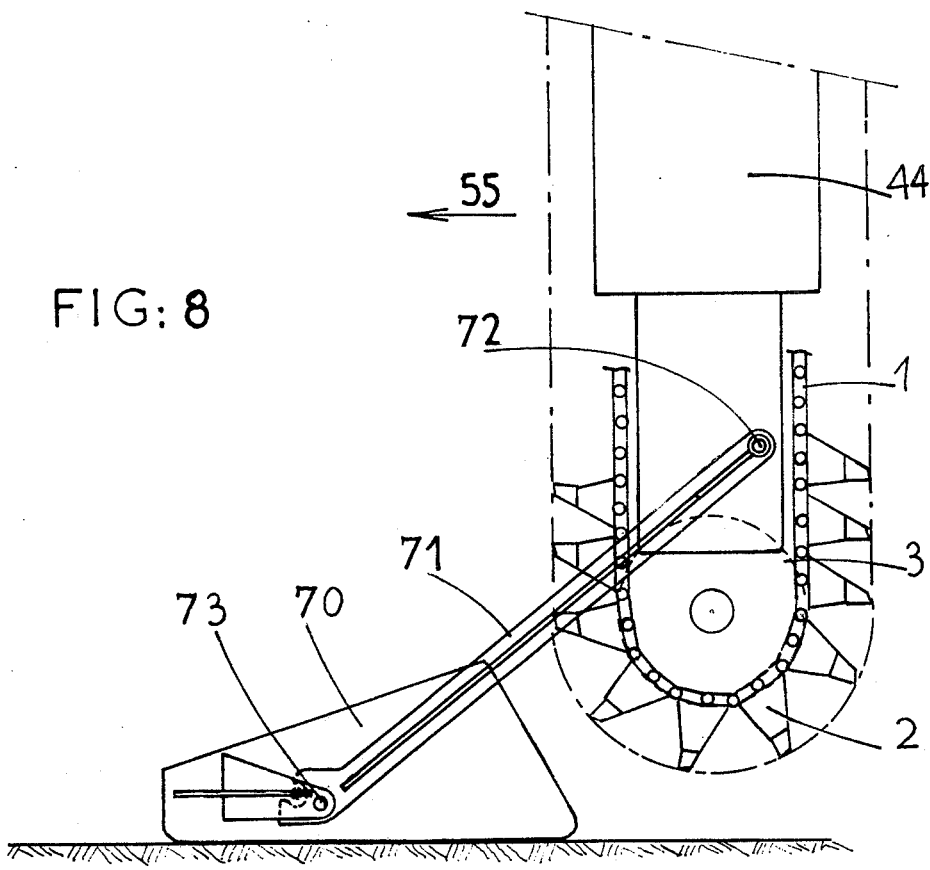

Referring to FIGS. 1 and 2, an elevator comprises an enless chain 1 on which a number of buckets 2 are disposed and which runs around direction-changing wheels 3–5 and a top driving wheel 6. The system formed by the chain and wheels is mounted in a vertical frame 8 which can move vertically and rotate on frame 10 of a lifting facility. The complete elevator structure can be pivoted around its vertical axis by motor 11. The top wheel 6 forms the place at which the buckets are emptied into a funnel or the like 7. Also, the elevator system comprising the chain 1 and its bearing arm 8 can be adjusted vertically relatively to frame 10 of the lifting facility. The means for vertical adjustment are not shown since they are completely conventional in equipment of the kind disclosed here and are familiar to all skilled addressees.

At the bottom the elevator arm bears a slat or the like 13 by way of arms 14, 15. A cross-piece 16 interconnecting the arms 14 at the bottom has at its centre a first articulation 17 for the slat 13. The same is also pivoted, on the same axis as the pivot 17, on another pivot 18 mounted at the end of the rod of a reciprocating actuator 19 whose casing is pivoted to a cross-member 20 interconnecting the two arms 15. A reciprocating actuator 21 also connects slat 13 to cross-piece 20, but the place at which the actuator head is connected to slat 13 is offset from the common axis of the two pivots or articulations 17, 18.

Clearly, by means of the integers 19, 21 the inclination of the slat axis passing through the pivots 7, 18 relatively to the vertical can be varied, as can the inclination of the slat 13 around the last-mentioned axis.

In normal operation of the elevator, which is the phase shown in FIGS. 1 and 2, the apparatus operates while moving horizontally along a side slope of a heap of material. In this case the lowest point of the elevator is a level 25 which is below its top level 26 by a distance substantially equal to the diameter of the elevator wound around its bottom reversing wheel. Between the levels 25 and 26 the material forms a natural slope 27 whose gradient depends of course upon the nature of the material. The slat 13 is adjusted to form with the horizontal an angle substantially equal to the natural angle of repose of the material. As is more clearly apparent in FIG. 2, the elevator moves along the slope 27 in the direction indicated by an arrow 28 and is maintained while moving in an angular position such that the axis of the wheel 3 is at an angle to the direction of elevator movement — in this case an angle of approximately 45°. Transversely the elevator is so disposed relatively to the slope 27 that the slat 13 always cuts the same at a constant thickness of material.

Because of the angular position of the system relatively to the direction of movement, the top of the slat 13 is always leading on the bottom — i.e. on the bucket filling point. Consequently, the "slice" of material cut from the slope drops spontaneously to the bottom of the apparatus, so that all the buckets are properly filled as the apparatus advances. Of course, the slat 13 can be adjusted by the actuator 21 to the optimum angle of attack for penetration into the heap without excessive forces.

Clearly, therefore, the only work required of the elevator chain is to elevate the material; the chain is not required to do any extracting work since the materials drop on their own down the slope towards the buckets due to the effect of the slat 13.

When the apparatus reaches the end of the side of the heap, to work in the same conditions on the return run in the opposite direction to that indicated by the arrow 28, the elevator is just pivoted around its vertical axis so as to have the same inclination as previously relatively to the slope, but in the reverse direction of movement, and the slat angle of attack is reversed by means of the actuator 21.

Each wheel 3 of the chain has blades 22, the rotating blades 22 help to break up the denseness of the heap and thus limit the forces required for horizontal movement. The blades 22 also help to protect the wheel 3 by keeping the material away from it.

When the heap has no side slope as, for instance, at the beginning of unloading of a ship's hold filled with bulk material, a furrow of substantially the same depth as the elevator bottom diameter must first be contrived whereafter subsequent operations can proceed as hereinbefore described from the two slopes of the resulting initial furrow.

Reference will be made to FIG. 3 to explain the operations leading to the first furrow. In a first operation or working step the elevator is lowered into the heap, without horizontal movement, until the lowest point of the buckets reaches the level a. The elevator is then moved horizontally, in the direction indicated by an arrow 30, to make the first furrow 31. Upon completion of the first horizontal movement the apparatus is lifted, whereafter the elevator system is turned through a semicircle, then lowered to level b and moved in the opposite direction, indicated by an arrow 32, so that a deeper furrow 33 is contrived. A number of "outward-and-back" movements of this kind are made, the elevator system being rotated through a semicircle around its vertical axis at each end of each run. When an adequate depth 35 has been reached, operation can proceed as hereinbefore described by runs outwards and back along the same slope, the elevator being turned just through a limited angle in symmetrical positions relatively to the perpendicular to the direction of movement. The slat 13 could be pivoted freely around the axis 17–18 without any adjusting actuator 21. For instance, in cases where the material being handled is of small grain size, like sand, for as it moved the slat 13 would in such cases automatically take up the best angle of attack for the best penetration into the side of the slope. Similarly, the system comprising the slat 13 and its support members 14, 15 could be a non-adjustable system without any actuator 19; in such cases the system would have to be interchangeable on the elevator arm 8 and systems would have to be available in a number of sufficient to deal with the various materials which the apparatus might be called on to handle. Instead of just a single slat 13, a number of shorter independent juxtaposed slats could be used, in which case the pivot places could be increased. Another possibility would be for the elevator base to have two diametrically opposite slats.

Referring now to FIGS. 4 and 5, an elevator comprises, as in the previous embodiments, an endless chain 1 having a number of buckets 2 and running around a direction-changing wheel 3. The top part of the elevator is not shown and is of completely conventional construction, for instance, as shown in FIGS. 1 and 2. The system comprising the chain and the chain-bearing wheels is borne by a vertical arm 44 which can move vertically and rotate on the frame of a lifting facility.

In operation the vertical arm 44 and the bucket elevator borne thereby can be moved horizontally. Extending around the bottom part of the chain is a spout or the like 46 whose front part — i.e., the part on the same side as the rising run of the elevator — is flared to resemble a funnel. The member 46 is borne by a set of arms 47 forming a bent or cranked system pivoted at a place 48 to a frame-like element of arm 44. The position of the members 46, 47 is controlled by a reciprocating actuator 49 pivoted at one end to arm 44 and at the other end to one of the arms 47.

A collecting funnel or spout or the like 51 is embodied by a flat bottom member and side uprights and is mounted on bent arms 52 pivoted at a place 53 to arm 44. The integer 51 is shown in the drawings in its operative — i.e., collecting — position in which its front part rests on the floor of the hold to be discharged. The other and open end of the integer 51 is disposed above the orifice of the spout or the like 46. By means of chains or cables 54, the member 51 can be raised and moved into an inoperative position (not shown); similarly, by means of the actuator 49 the member 46 can be moved into an inoperative position in which it leaves the bottom part of the bucket elevator 1, 2 completely clear.

As will be readily apparent, when the system comprising the arm 44 and the elevator move horizontally in the direction indicated by an arrow 55, material is forced into the member 51 and up the inclined surface formed by its bottom member; when sufficient material has collected in the member 51, it spills into the member 46 and is immediately picked up by the buckets 2.

Throughout the first phase of emptying the hold, the members 51, 46 remain in their respective inoperative positions and the elevator 1 operates normally either with direct filling of the buckets or using e.g. the facility shown in FIGS. 1 and 2. When the bottom of the hold has almost been reached, and after the other auxiliary elements have been removed or placed in their inoperative positions, the integers 51, 46 are positioned as shown and the system is moved to collect the last layer. Further sweeps are given if necessary; if the arm 44 is rotatable on the lifting facility, the direction can be reversed at the end of each run.

Referring now to a further variant shown in FIGS. 6 and 7, the elevator is identical to the elevator described with reference to FIGS. 4 and 5 and comprises a bottom funnel or spout or the like 46 similar to the member 46 of FIGS. 4 and 5 and pivoted in the same way as the latter to arm 44. A shovel 60 is pivoted at a place 61 to the end of arm 62 which is pivoted at a place 63 to arm 44. Through the agency of an actuator 68 having one end connected to arm 44 and the other end to shovel 60, the same can be placed either in the lowered collecting position shown in solid line in FIG. 6 or in the raised emptying or discharge position shown in chain-dotted lines in FIG. 6. With the shovel lowered, the system comprising the arm and shovel rests on the bottom of the hold by way of the shovel front end. When the actuator 68 lifts the shovel, arm 62 is kept suspended by chain or cable 65 which is secured at a place 66 to arm 62 and which is connected to a top adjusting mechanism (not shown). Clearly, when the arm system is moved in the direction indicated by an arrow, material accumulates in the shovel 60. The movement ceases upon the shovel 60 being raised by actuator 68. When the shovel 60 is in its raised position, the material in the shovel discharges into the collector 46 to be picked up by the elevator buckets. As in the case of the system shown in FIGS. 4 and 5, the shovel 60 and its support members can be moved into a neutral inoperative position by means of the chain 65 and actuator 49 respectively.

Figure 9:
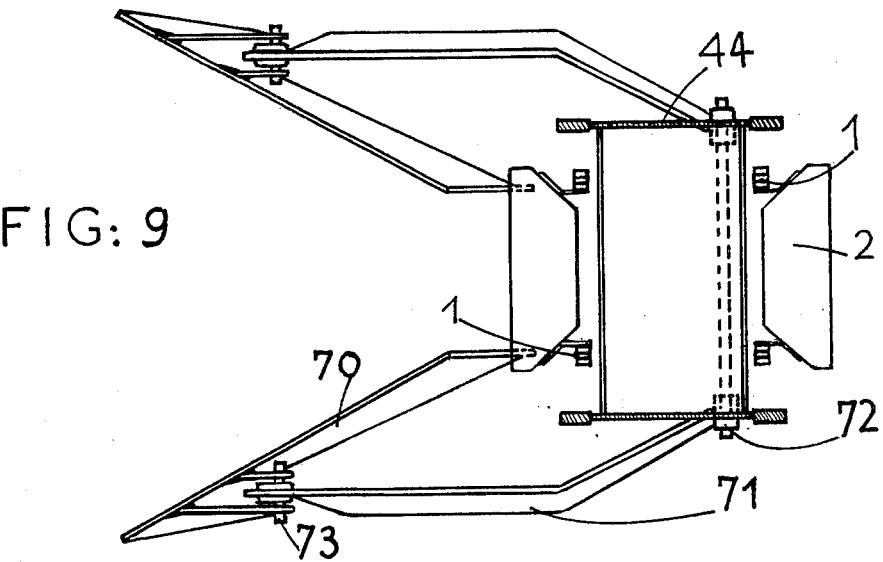

Referring to FIGS. 8 and 9, which shows another embodiment used in the same kind of elevator borne by the arm 44, the same bears in this embodiment two deflecting slats or the like 70 which are disposed symmetrically of the average working plane of the elevator and on the same side as the rising run thereof. The slats 70 are mounted on bent arms 71 pivoted at places 72 to arm 44 and at places 73 to slat 70. Pivot 73 comprises an abutment serving as a means of limiting angular movement of slat 70. Two similar symmetrical devices are of course disposed one on each side of the elevator. When the arm 44 moves horizontally in the direction indicated by arrow 55, the thin layer of material remaining on the floor is concentrated near the buckets in the form of a considerably thicker layer, and so the buckets can collect the accumulated material. The slats 70 and the arms 71 can be raised into their inoperative positions, for instance, by means of chains or cables as in the case of the organs shown in FIG. 6 and 7, although this feature is not shown.

With all the systems described, the elements for guiding the material descend lower than the bottom part of the elevator, and so a fairly large clearance can always be maintained between the bottom part of the elevator and the hold floor and there is no risk of the elevator being damaged as a result of slight vertical motions of the elevator-bearing arm.

The invention is not of course limited just to the embodiments hereinbefore described as examples but covers other embodiments which differ only in details.

I claim:

1. Bulk handling apparatus for removing material from the sloping face of a pile of material comprising a substantially vertical bucket elevator, a discharge for said bucket elevator, means for removing handled substances at said elevator discharge, a substantially vertical moveable arm supporting said bucket elevator, means for rotating said arm around its vertical axis, means for supporting said moveable arm for horizontal movement of said arm along the face of the pile of material, slat cutting means mounted for articulation around a long axis adjacent the bottom of said arm and means for positioning said slat cutting means substantially parallel to the slope of the face of the pile of material and substantially in a plane extending through the buckets of the elevator, said positioning means holding said slat cutting means in position during use with the upper end of said slat leading the bottom end of said slat during horizontal movement of said arm and of said slat along the face of the pile.

2. Apparatus according to claim 1, including means for adjusting the tilt of the said slat means relative to the vertical axis of said arm.

3. Apparatus according to claim 1, including means for adjusting the inclination of said slat means around said axis.

4. Apparatus according to claim 1, said slat means and said mounting being demountable.

* * * * *